US009639257B2

(12) United States Patent
Rahn

(10) Patent No.: US 9,639,257 B2
(45) Date of Patent: May 2, 2017

(54) SYSTEM AND METHOD FOR SELECTING INTERFACE ELEMENTS WITHIN A SCROLLING FRAME

(71) Applicant: Adobe Systems Incorporated, San Jose, CA (US)

(72) Inventor: Andrew Benjamin Rahn, Minneapolis, MN (US)

(73) Assignee: Adobe Systems Incorporated, San Jose, CA (US)

( * ) Notice: Subject to any disclaimer, the term of this patent is extended or adjusted under 35 U.S.C. 154(b) by 119 days.

(21) Appl. No.: 14/021,343

(22) Filed: Sep. 9, 2013

(65) Prior Publication Data
US 2015/0074590 A1    Mar. 12, 2015

(51) Int. Cl.
*G06F 3/048* (2013.01)
*G06F 3/0485* (2013.01)
*G06F 3/0488* (2013.01)

(52) U.S. Cl.
CPC .......... *G06F 3/0485* (2013.01); *G06F 3/0488* (2013.01); *G06F 3/04855* (2013.01)

(58) Field of Classification Search
CPC .. G06F 3/04842; G06F 3/04817; G06F 3/017; G06F 3/0481–3/04886
See application file for complete search history.

(56) References Cited

U.S. PATENT DOCUMENTS

| 2008/0122796 | A1* | 5/2008 | Jobs et al. | 345/173 |
| 2008/0297482 | A1* | 12/2008 | Weiss | 345/173 |
| 2009/0282332 | A1* | 11/2009 | Porat | G06F 3/0482 715/702 |
| 2014/0137039 | A1* | 5/2014 | Kroeger | G06F 3/04817 715/810 |

* cited by examiner

Primary Examiner — Claudia Dragoescu
(74) Attorney, Agent, or Firm — Shook, Hardy & Bacon L.L.P.

(57) ABSTRACT

A system and method are disclosed. A user input device may be configured to receive an input from a user. A visual display may be configured to display interface elements in a frame configured to scroll along a first axis based on the input as received by the user input device being substantially along the first axis and to switch display of interface elements of a subset of the interface elements between an unselected configuration and a selected configuration in response to a first input as received by the user input device being substantially along a second axis orthogonal to the first axis. The visual display may not switch display of the interface elements between the unselected configuration and the selected configuration based on the input along the first axis without first receiving the first input along the second axis.

18 Claims, 10 Drawing Sheets

SYSTEM AND METHOD FOR SELECTING INTERFACE ELEMENTS WITHIN A SCROLLING FRAME

TECHNICAL FIELD

This disclosure relates generally to the technical fields of software and/or hardware technology and, in one example embodiment, to a system and method to select interface elements within a scrolling frame.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computing devices and consumer electronic devices, such as personal computers (PCs), tablet computers, smartphones, personal digital assistants (PDAs), media players, and the like, commonly include a graphical user interface (GUI). The GUI may facilitate operation of the devices by allowing users to scroll among and select interface elements, such as icons, images, text, links, and the like, that may start applications, choose images for viewing, text for copying, open web pages, and so forth. Such devices may incorporate a user input device, such as a touchscreen, a mouse, a trackball, a visual motion detector, and the like, that allows the user to scroll and select interface elements.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
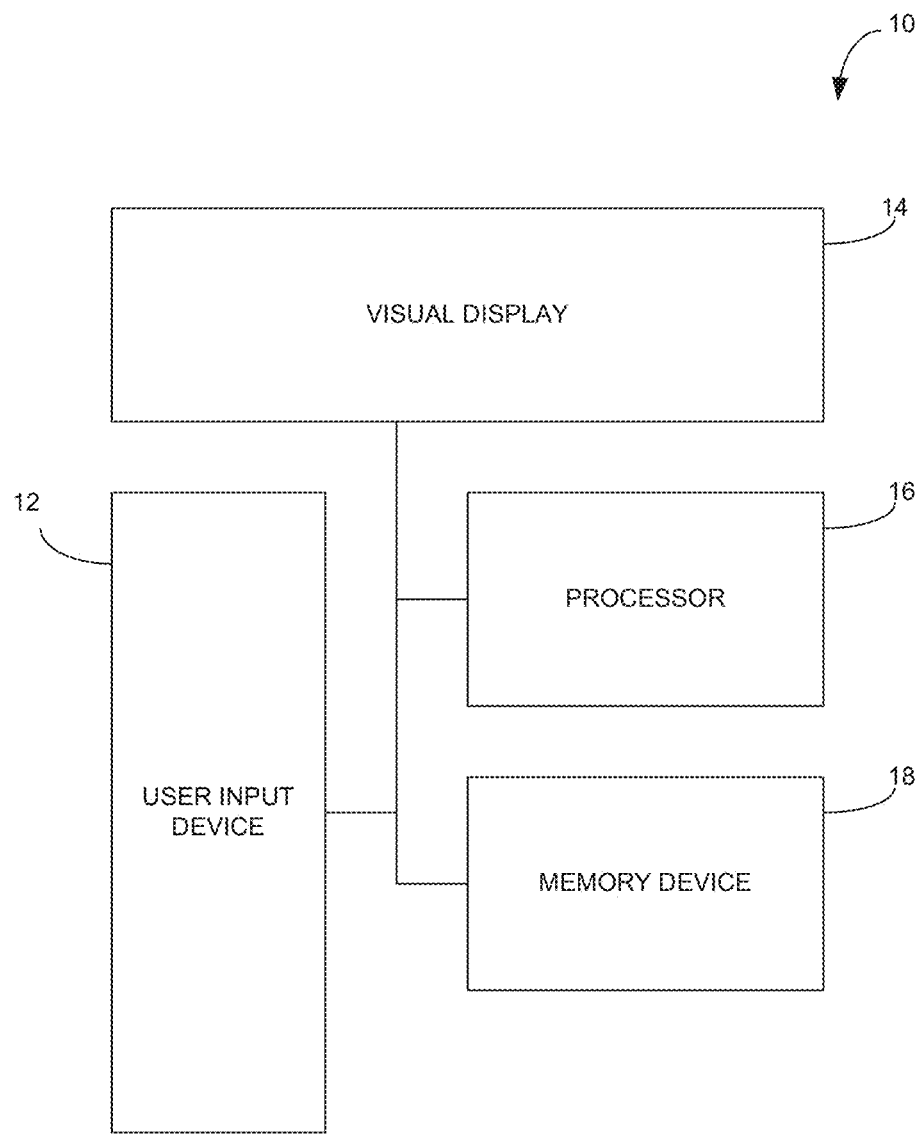
FIG. 1 is a block diagram of a system, in accordance with an example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Certain user input devices include separate mechanisms for initiating motion within a GUI and selecting interface elements. For instance, a mouse conventionally includes a mechanism, such as a light sensor or rollerball, for translating the motion of the mouse into movement within the GUI, such as by moving a cursor within the GUI, and a button for selecting interface items in relation to the cursor. However, various alternative user input devices, such as a touchscreen or a visual motion detector, may tend to rely on a single mechanism for user interaction, such as a physical touch in the case of a touchscreen. The touchscreen may then seek to differentiate between types of touches. For instance, a swipe or drag of a finger along the touchscreen may be interpreted as movement within the GUI while a tap or other quick touch and release action may be interpreted as a selection of an interface element.

However, such distinction between types of touches or other interactions may make certain actions relatively inconvenient. For instance, while the selection of an individual interface element with a tap action may be convenient and efficient, the selection of multiple interface elements through tapping may be comparatively inconvenient, particularly in relation to the ability of a mouse to loop and select multiple interface elements. However, given that swipes may correspond to scrolling or other movement within the GUI, certain user input devices may tend to rely on taps for the selection of interface elements.

A system, device, and method have been developed that may facilitate the selection of multiple interface elements. In various examples, scrolling occurs along one axis of a frame of the GUI but not in the other (i.e., a frame may scroll up-and-down but not side-to-side or vice versa). Consequently, the swipe action may be useful in the axis of scrolling but essentially unutilized in the axis orthogonal to the axis scrolling as an input to the GUI. The system, device, and method may interpret a user input to a user input device along an axis orthogonal to the scrolling axis as a selection of interface elements or, more generally, of switching a selection configuration of the interface elements between an unselected condition and a selected condition, depending on a stating condition of the interface element. A subsequent user input along the scrolling axis may be interpreted as a continuation of the selection of interface elements, allowing multiple interface elements along both axes to be selected without individually selecting, such as through tapping, each interface element. The scrolling function may be maintained, allowing for concurrent selection and scrolling based on movement along the scrolling axis.

FIG. 1 is a block diagram of a system 10, in accordance with an example embodiment. The system 10 includes a user input device 12 and a visual display 14. The user input device 12 may be any of a variety of suitable devices, including, but not limited to, a touchscreen, a mouse, a touchpad, a trackball, a motion detector, keys or a keyboard, and the like. The visual display 14 may be any of a variety of suitable displays, including, but not limited to, a liquid crystal display (LCD), a light emitting diode (LED) display, an organic light emitting diode (OLED) display, a cathode ray tube (CRT), and the like.

As illustrated, the system 10 further optionally includes a processor 16 and a memory 18. The processor 16 may be a conventional processor 16 utilized in computing devices and/or consumer electronic devices, including a microprocessor, a microcontroller, a custom-designed circuit, and the like. The processor 16 may include multiple processors, either within a single package or distributed over multiple locations. The memory 18 may incorporate one or more types of memory and/or storage devices, including random access memory (RAM), read-only memory (ROM), flash memory and other electrically erasable programmable read-only memory (EEPROM), hard disks, compact discs (CDs), DVDs, and the like.

The system 10 may be a single device, such as a tablet computer, laptop computer, smartphone, medial player, PDA, and the like. The system 10 may be a local system, such as a conventional desktop computer or workstation arrangement with a user input device 12 and visual display 14 separate from but locally connected to the processor 16 and memory 18. The system 10 may be a remote system, with the user input device 12 and the visual display 14 providing interaction with a remotely located processor 16 and memory 18, such as through the remote interaction of a workstation with a server, mainframe computer, or network-based "cloud" resources. It is to be understood that the system 10 may include multiple ones of the above modes concurrently, and thus a tablet computer may have both an integral processor 16 and memory 18 while also accessing and utilizing cloud-based processors 16 and memory 18.

It is to be understood that the system 10 may include various additional optional components such as may be included in computing devices and/or consumer electronic devices. Such components may be ancillary or otherwise unrelated to the function of the components 12, 14, 16, 18 and the methods described herein. Alternatively, certain such components, such as a camera, may be utilized as part of or in supplement to the functions and methods disclosed herein. In an example, the camera may be or may be a component of the user input device 12, such as where the user input device is a motion detection system.

Figure 2:
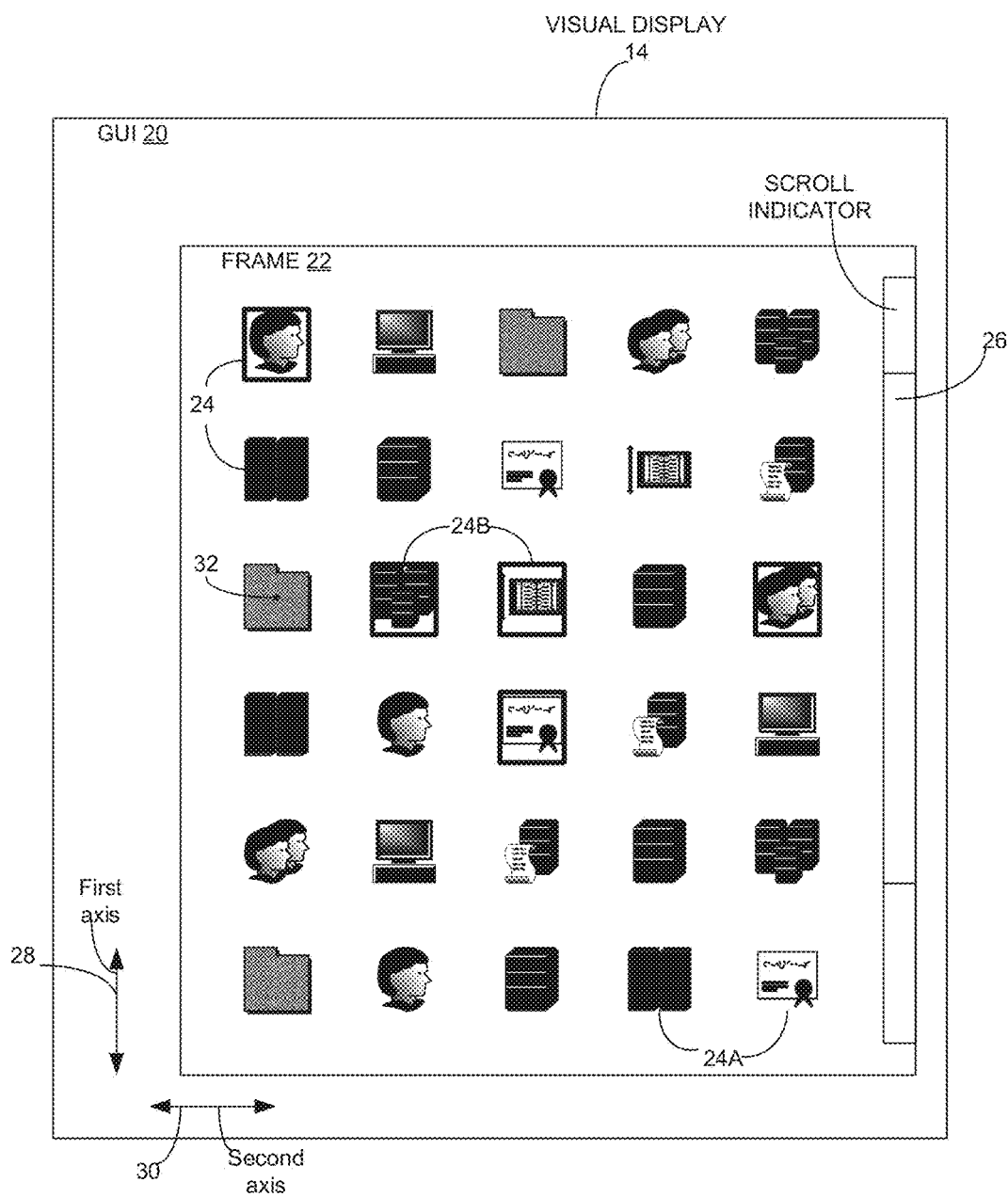
FIG. 2 is an abstract image of a graphical user interface (GUI) as displayed on a visual display, in accordance with an example embodiment.

FIG. 2 is an abstract image of a graphical user interface (GUI) 20 as displayed on the visual display 14, in accordance with an example embodiment. The GUI 20 includes one or more frames 22 in which multiple interface elements 24 may be displayed. A single frame 22 may be coextensive with the GUI 20 itself, may occupy a sub-portion of the GUI 20, or multiple frames 22 may be incorporated within the GUI 20. Interface elements 24 may optionally be included in the GUI 20 outside of any given frame 22.

The interface elements 24 may be visual elements such as icons, images, text characters, Internet links, spreadsheet cells, graphs or components of a graph, and the like. As such, an interface element 24 may be any of a variety of visual objects that may be selected via the GUI 20, such as to select or start a related application, select or display a related image, select or play a related media file, select or copy a related image, media file or text, access various system functions, such as copy, paste, create a new folder, a context menu, select or move the interface element 24, and so forth. Interface elements 24 may also pertain to file structures, in which the selection of an interface element 24 may result in the display of additional interface elements 24 that are stored in a file structure associated with the first interface element 24.

Prior to selection, the interface elements 24 may correspond to an unselected configuration 24A. The unselected configuration 24A may correspond to a base state of the interface elements 24. Upon selection, the visual display 14 may display the selected interface elements 24 in a selected configuration 24B. The selected configuration 24B may change the appearance of the interface element 24, such as by highlighting or otherwise marking the interface element 24, or by executing an application or function related to the interface element 24, such as by displaying a related image or starting a related application or media file.

The frame 22 optionally includes a scroll indicator 26 to indicate a visible portion of the frame 22 in relation to the entire frame 22. As illustrated, the scroll indicator 26 is a sliding indicator that shows at a relatively high granularity the visible portion of the frame 22. It is to be understood that the scroll indicator 26 may be any of a variety of formats, including a selector for discrete sub-frames or pages of the frame 22 in contrast to the sliding indicator. In various examples, the scroll indicator 26 may be utilized to scroll within the frame 22, such as by selecting the scroll indicator 26 via the user input device 12 and manipulating the scroll indicator 26.

As discussed in detail herein, the user input device 12 may be utilized to interact with the GUI 20. Per the systems and methods disclosed herein, the user input device 12 may interact with the GUI 20 by selecting interface elements 24 and scrolling the frame 22 based on a single interface mode. In an example, the single mode of a touchscreen or touchpad may be various types of touching of the user input device 12 by the user.

It is to be noted that various user input devices 12 may incorporate multiple interface modes. For instance, a mouse may have a motion detector and a button. In the examples herein, the mouse may be configured to both select and scroll without using the button. In other words, multi-mode user input devices 12 may be utilized in a single mode per the systems and methods disclosed herein.

The GUI 20 includes a first axis 28 and a second axis 30 orthogonal to the first axis 28. The scroll of the frame 22 is along or substantially along the first axis. As illustrated, the first axis 28 is vertical relative to the illustrated orientation of the GUI 20, though it is to be understood that the first axis 28 may, in various examples, be any of a variety of alternative orientations, such as horizontal or diagonal. In such examples, the frame 22 would thus scroll horizontally or diagonally, as appropriate.

As will be illustrated herein, an input along the first axis 28 may cause visual display 14 to display the frame 22 scrolling in the direction of the input. In the example of a touchscreen, a touch and drag motion in substantially the downward direction, i.e., substantially along the first axis 28, may cause the frame 22 and/or the content of the frame to scroll down. By contrast, a touch and drag motion in substantially the upward direction, i.e., substantially along the first axis 28, may cause the frame 22 to scroll up. A touch and drag motion substantially sideways, i.e., substantially along the second axis 30, would not cause the frame 22 to scroll.

In an example, a user input is substantially along one of the axes 28, 30 based on various margins of error. In an example, an input is substantially along an axis 28, 30 if the input indicates movement within thirty (30) degrees of the axis 28, 30. In such an example, with only sixty (60) degrees being consumed by motions for selection and scrolling, the remaining thirty (30) degrees may not indicate a command or may be allocated to an alternative command, such as selection of an interface element 24. An alternative example would include movement within ten (10) degrees of the axes 28, 30 indicating scrolling or selection.

Alternatively, any input that indicates movement may be determined to be substantially along the axis 28, 30 with the greatest component of motion (e.g., the largest vector). In other words, if a touchscreen indicates a touch and drag movement that is less than forty-five degrees of an axis 28, 30, such as a touch and drag input on a touchscreen, the input may be interpreted as being substantially along the axis 28, 30.

In an alternate example, one axis 28, 30 may be favored over the other. For instance, movement within sixty (60) degrees of the vertical axis 28 may cause scrolling while movement within thirty (30) degrees of the horizontal axis 30 may cause selection of interface elements 24. In such an example, then, scrolling may be favored over selection, with a user needing to be relatively close to the horizontal axis 30 to cause selection. It is to be recognized that many configurations are possible, and that selection may be favored over scrolling in various configurations. In various examples, the various angles to the axes 28, 30 are separately selectable and configurable to tune selection and scrolling, such as to a user preference or other factor.

Additionally, an input received by the user input device 12 that does not indicate movement may be a selection of an interface element 24 in relation to the input (for instance, with a respect to a touchscreen, a touch and release or tap on the touchscreen in relation to a particular interface element 24). A tap on the touchscreen may be in relation to a particular interface element 24 if the tap touches the interface element 24, is within a particular range of a center 32 of an interface element 24 with or without necessarily touching the interface element 24, or is closer to the interface element 24 or the center 32 of the interface element 24 than any other interface element.

While the operations for selecting one or more interface elements 24 may affirmatively select the related interface elements 24, the same operation when applied to an interface element in the selected configuration 24B may place the interface element in the unselected configuration 24A.

FIGS. 3A-6F illustrate various concepts related generally to switching between selected and unselected configurations of interface elements 24 and scrolling within the frame 22, according to various example embodiments. The examples of FIGS. 3A-6F will be discussed with respect to the user device 12 being configured to detect touchscreen or touchpad inputs, such as taps and swipes. However, it is to be understood that the inputs may be through alternative inputs. For instance, a mouse or a trackball may be used to pause a cursor over an interface element 24 to perform the equivalent of a tap on a touchscreen, while a relatively substantial movement of the mouse may be the equivalent to a swipe on a touchscreen. Similarly, a motion sensor may detect a pause or a certain gesture as equivalent to a tap and a sweep of an arm horizontally or vertically as the equivalent to a swipe. It is to be recognized that alternative user input devices 12 are contemplated with related inputs. As noted above, while the examples of FIGS. 3A-6F show a vertical first axis 28, along which the frame scrolls, and a horizontal second axis 30, the arrangement may be reversed, with a horizontal first axis 28 and a vertical second axis 30.

Figure 3A:
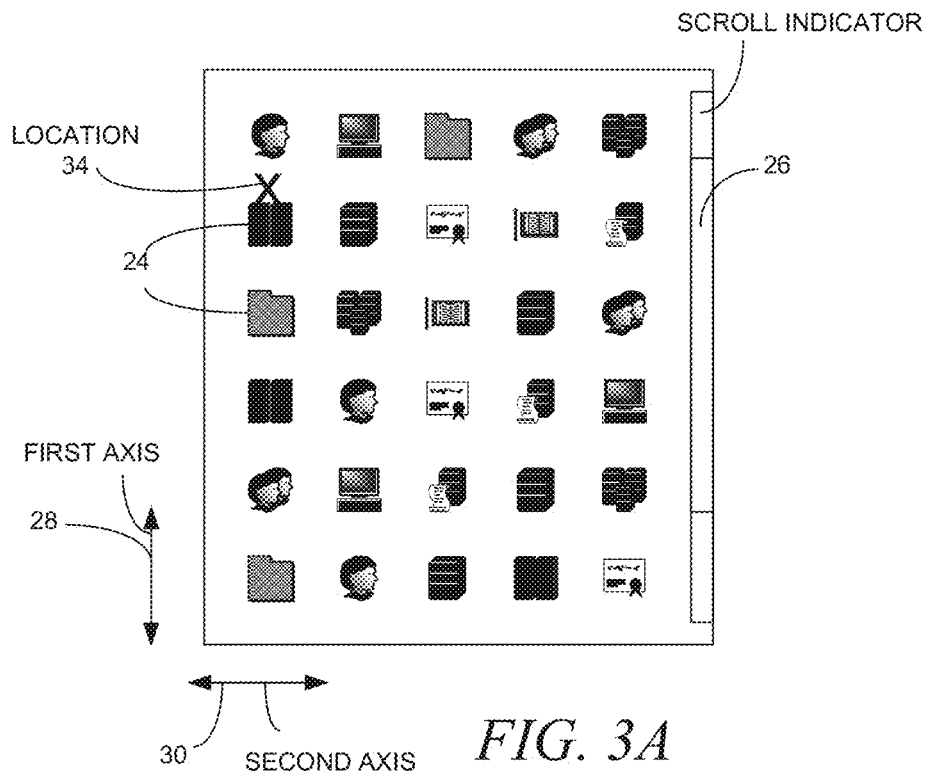
FIGS. 3A and 3B are images of a frame that illustrates scrolling in a frame without selecting interface elements or otherwise changing the configuration of the interface elements, in an example embodiment.
Figure 3B:
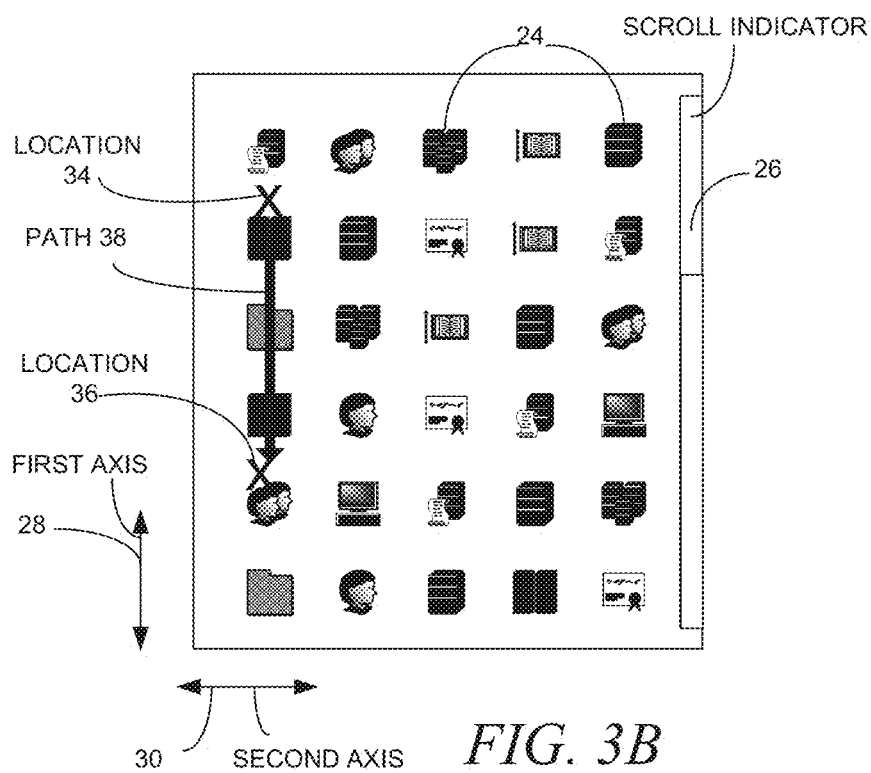

FIGS. 3A and 3B illustrate scrolling in a frame without selecting interface elements 24 or otherwise changing the configurations 24A, 24B of the interface elements, as discussed herein, in an example embodiment. In FIG. 3A, the user input device 12 detects the placing of a detectable object, such as a finger, on a location 34. In FIG. 3B, the user input device 12 detects the movement of the detectable object to a second location 36 along a path 38 substantially along the first axis 28. As the movement along the path 38 occurs, the frame 22 scrolls along the first axis 28, as illustrated in the displacement of the interface elements 24 and the change of the scroll indicator 26. Because the movement is along the first axis 28 without first having been along the second axis, the interface elements 24 along the path 38 are not placed in the selected configuration 24B.

Figure 4A:
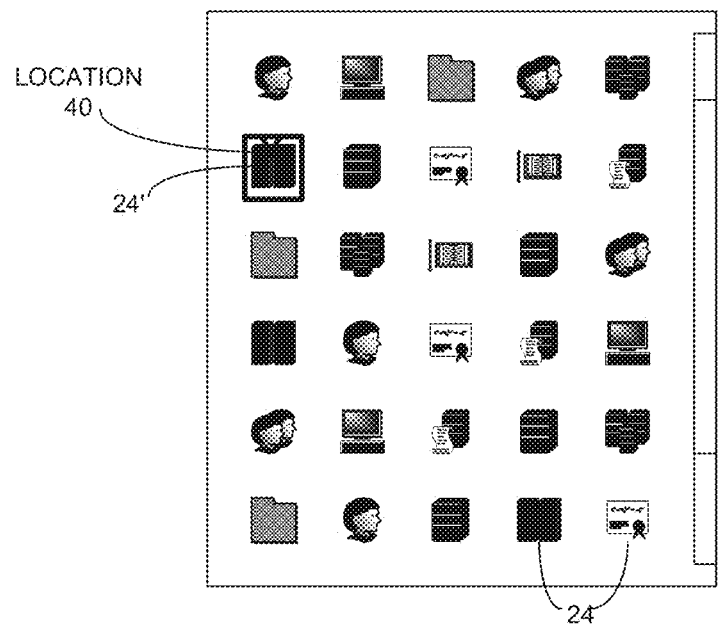
FIGS. 4A and 4B are images of a frame that illustrates selecting individual interface elements, in an example embodiment.
Figure 4B:
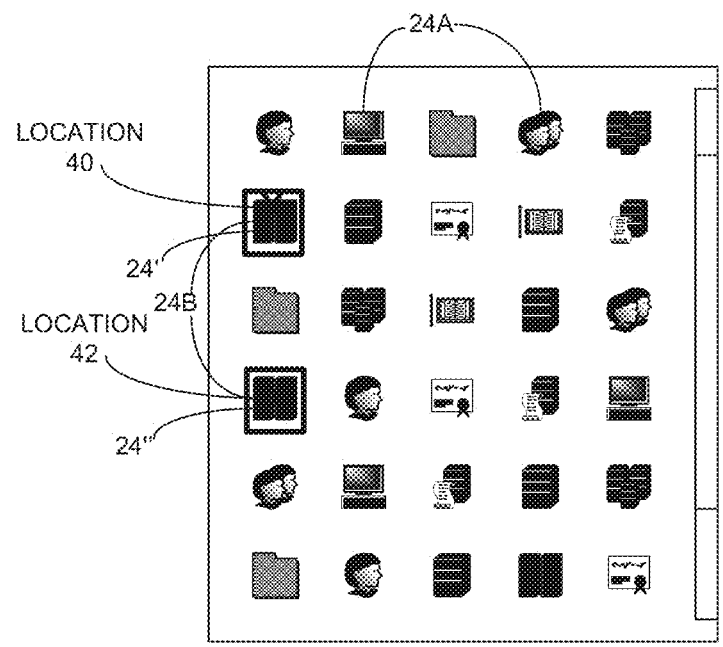

FIGS. 4A and 4B illustrate selecting individual interface elements 24, in an example embodiment. In FIG. 4A, a first interface element 24' is selected when the user input device 12 detects a tap on a location 40 on the first interface element 24'. In an example, a tap executes a function of the first interface element 24', such as by executing a related application. Alternatively, a tap selects the interface element 24' without executing a function of the interface element 24'. In either case, as illustrated, the tap places the interface element 24' in the selected configuration 24B. In FIG. 4B, a second interface element 24" is selected when the user interface device 12 detects a tap in a second location 42 on the second interface element 24". In an example, the tap is a double tap, which executes the function of both the first, already selected interface element 24' and the second interface element 24". While the example of FIGS. 4A and 4B are with respect to selecting individual interface elements 24, it is to be understood that the principles apply equally well to switching interface elements 24 from the selected configuration 24B to the unselected configuration 24A.

Figure 5A:
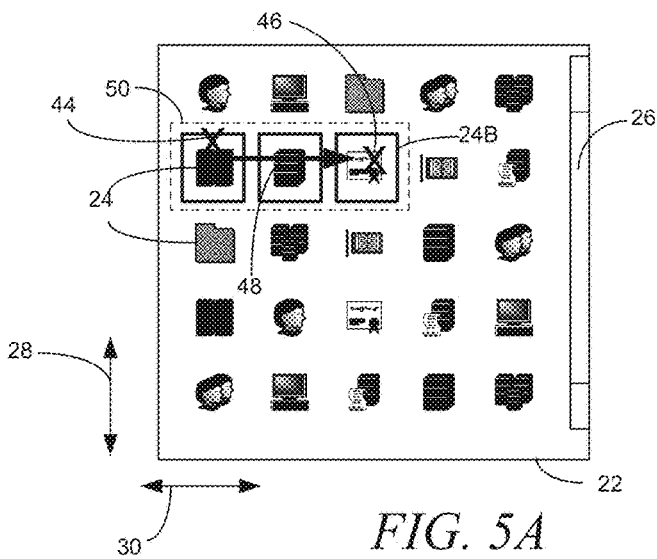
FIGS. 5A-5F are images of a frame that illustrates switching a configuration of multiple interface elements between an unselected configuration and a selected configuration, in an example embodiment

FIGS. 5A-5F illustrate switching a configuration of multiple interface elements 24 between the unselected configuration 24A and the selected configuration 24B, in an example embodiment. In FIG. 5A, the user input device 12 detects a swipe from a first location 44 to a second location 46 along a first path 48 substantially along the second axis 30. A first subset 50 of interface elements 24 in relation to the first path 48, e.g., as touched by the first path 48 or in proximity of the first path 48, are displayed by the visual display 14 in the selected configuration 24B. It is noted that the scroll bar 26 indicates that the visible portion of the frame 22 is approximately in the middle of the frame 22.

Figure 5B:
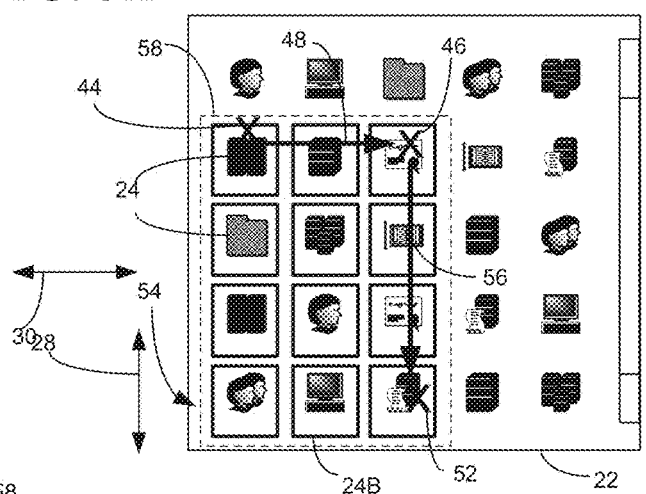

In FIG. 5B, the user input device 12 detects a swipe from or near the second location 46 to a third location 52 on the bottom row 54 along a second path 56 along the first axis 28. The first subset 50 is expanded to a second subset 58 to include the interface elements 24 within a rectangular shape defined by the first and second paths 48, 56. The visual display 14 displays the interface elements 24 in the second subset 58 in the selected configuration 24B. In various examples, the swipe along the second path 56 is based on a continuous input with the user input device 12 along the first and second paths 48, 56 (e.g., a user's finger is continuous contact with a touchscreen from the first location 44 to the third location 52). In an alternative example, once the first path 48 is taken, the input may be discontinuous (e.g., any subsequent swipe on the touchscreen results in the selection of the related interface elements 24).

Figure 5C:
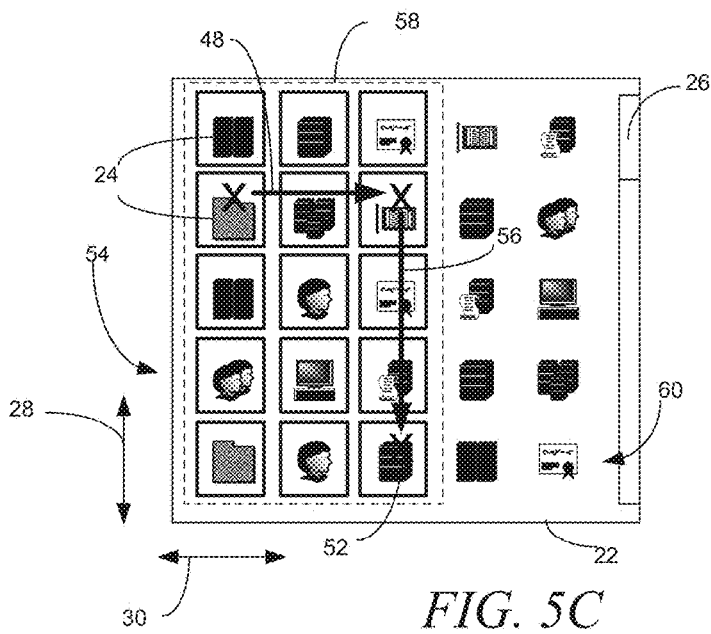

In FIG. 5C, after the input holds at the third location 52 on the original bottom row 60 after traversing along second path 56, the frame 22 scrolls down and the new bottom row 60 of interface elements 24 is displayed. The scroll bar 26 updates to indicate that, as illustrated, the bottom of the frame 22 has been reached. Some of the interface elements 24 of the new bottom row 60 are included in the second subset 58 based on their relation to the first and second paths 48, 56.

Figure 5D:
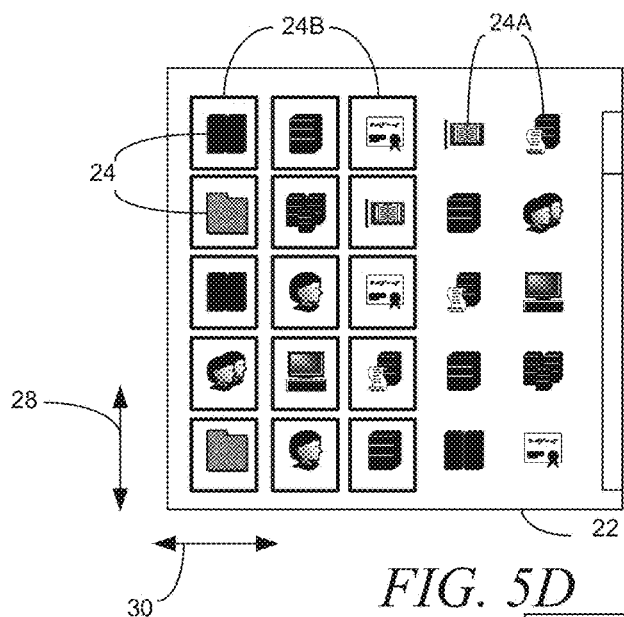

In FIG. 5D, the input as detected by the user input device 12 ceases and the interface elements 24 remain in the selected configuration 24B. It is to be recognized that in FIGS. 5A-5C, the interface elements 24 of the first and second subsets 50, 58 may optionally be held in the unselected configuration 24A until the input ceases, such as is the case in FIG. 5D and is optionally the case in FIG. 5B, whereupon the interface elements 24 of the first and second subsets 50, 58 are displayed by the visual display in the selected configuration 24B.

Figure 5E:
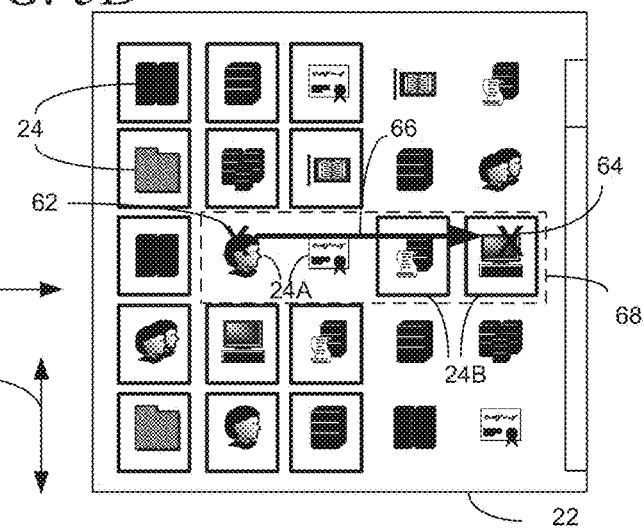

In FIG. 5E, the user input device detects an input from a fourth location 62 to a fifth location 64 along a third path 66 along the second axis 30 to form a third subset 68. The selected and unselected configuration of the interface elements 24 in relation to the third path are switched to the opposing configuration. As illustrated, interface elements 24 are placed in the unselected state 24A if the interface element 24 started in the selected state 24B and in the selected state if the interface element 24 started in the unselected state 24A.

Figure 5F:
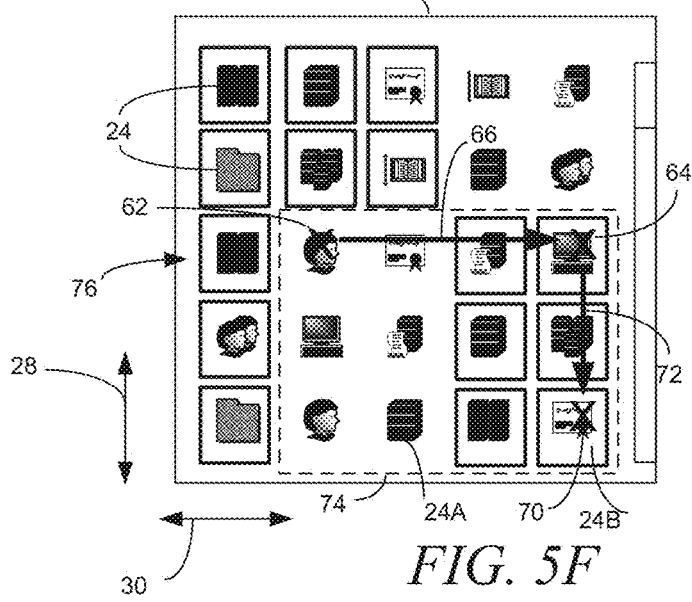

In FIG. 5F, the user input device 12 detects a swipe from or near the fifth location 64 to a sixth location 70 along a fourth path 72 along the first axis 28. The third subset 68 is expanded to a fourth subset 74 to include the interface elements 24 within a rectangular shape defined by the third and fourth paths 66, 72. The visual display 14 displays each of the interface elements 24 in the fourth subset 74 in a configuration 24A, 24B that is switched from the individual interface elements' 24 original configuration 24A, 24B. As illustrated, interface elements 24 are placed in the unselected state 24A if the interface element 24 started in the selected state 24B and in the selected state if the interface element 24 started in the unselected state 24A. Interface elements that were originally placed in the third subset 68 are not changed again.

As above, in various examples, the swipe along the fourth path 72 is based on a continuous input with the user input device 12 along the third and fourth paths 66, 72 (e.g., a user's finger is continuous contact with a touchscreen from the fourth location 62 to the sixth location 70). In an alternative example, once the third path 66 is taken, the input may be discontinuous (e.g., any subsequent swipe on the touchscreen results in the ultimate change of configuration 24A, 24B of the related interface elements 24).

As with the example of FIGS. 5A-5C, the interface elements in relation to the third path 66 may be held in their respective original configurations 24A, 24B and then switched to their changed configuration 24A, 24B, as appropriate. It is to be understood that the example above is exemplary and that the additional movement along the first axis 28 is optional. The configuration of interface elements 24 may be switched between the unselected and selected configurations 24A, 24B simply on the basis of a swipe along the second axis 30. As noted above, execution of the interface elements 24 in the selected configuration 24B may occur automatically following the selection of the interface elements 24 or may be on the basis of an additional input.

In various examples, the locations 44, 46, 52, 62, 64, 70 represent a farthest-point of movement along the respective axes 28, 30. Thus, for example, while the user may deviate from the path 48 between locations 44 and 46, the user may not have gone past the location 46. In such an example, the user interaction may be thought of as applying "ink"; the interface items 24 at the farthest extent that the user traveled along each axis 28, 30 become selected even if and after the user interaction retreats away from the interface items 24. In such an example, in the examples herein, the locations 44, 46, 52, 62, 64, 70 are definitionally the farthest extent of the user interaction along each axis 28, 30.

Alternatively, the user may overshoot the locations 44, 46, 52, 62, 64, 70 but ultimately return to the locations 44, 46, 52, 62, 64, 70. Thus, in an example, the user may proceed past location 46 along the first path 48 but ultimately return to the location 46 before proceeding along the second path 56 to show the selected configuration as illustrated. In such an example, the locations 44, 46, 52, 62, 64, 70 define starting points and ending points and the interface items 24 affected by the user interaction are redefined over the course of the user interaction. Thus, if the user interaction retreats away from various interface items 24 or goes past but ultimately returns to a location 44, 46, 52, 62, 64, 70, interface items 24 that were once selected 24B may revert to the unselected state 24A, or vice versa. It is to be recognized and understood that while the discussion of this and the preceding paragraph is discussed in particular with respect to FIGS. 5A-5F, the principles discussed are applicable throughout this disclosure.

While the interface elements 24 of the example of FIGS. 5A-5F are organized into rows 76, it is to be understood that the interface items 24 may be positioned irregularly. Individual interface elements 24 that meet the position requirements of the various locations and paths may have their configuration 24A, 24B switched without respect to their positional relationship to other interface elements 24. As such, a user may reposition interface elements 24 as desired while retaining the ability to operate according to the example of FIGS. 5A-5F.

FIGS. 6A-6F illustrate switching a configuration of multiple interface elements 24 between the unselected configuration 24A and the selected configuration 24B, in an example embodiment. As will be illustrated below, in contrast to the example of FIGS. 5A-5F, the example of FIGS. 6A-6F operate based on the organization and positioning of the interface elements 24 in rows 76.

Figure 6A:
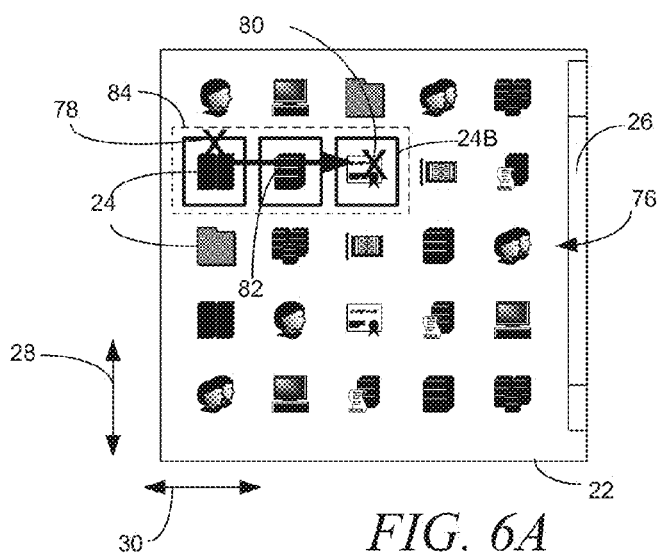
FIGS. 6A-6F are images of a frame that illustrates switching a configuration of multiple interface elements between an unselected configuration and a selected configuration, in an example embodiment.

In FIG. 6A, the user input device 12 detects a swipe from a first location 78 to a second location 80 along a first path 82 substantially along the second axis 30. A first subset 84 of interface elements 24 in relation to the first path 82, e.g., as touched by the first path 82 or in proximity of the first path 82, are displayed by the visual display 14 in the selected configuration 24B.

Figure 6B:
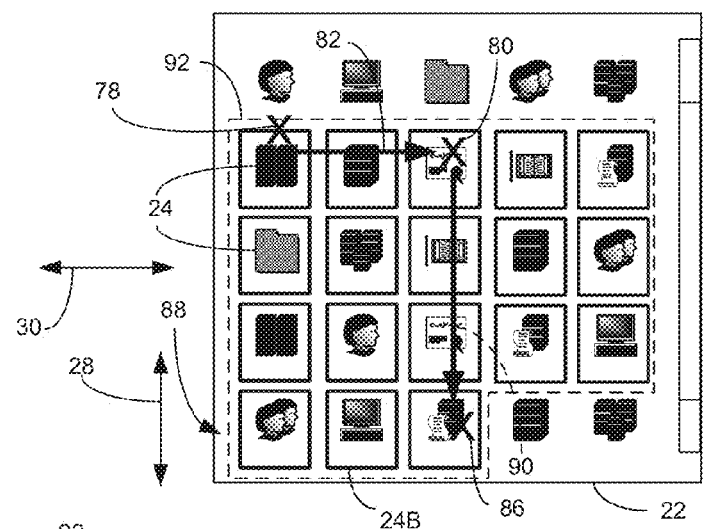

In FIG. 6B, the user input device 12 detects a swipe from or near the second location 80 to a third location 86 on the bottom row 88 along a second path 90 along the first axis 28. The first subset 84 is expanded to a second subset 92 to include the interface elements 24 within a rectangular shape defined by the first and second paths 82, 90 as well other interface elements 24 within the rows 76 included from the second location 80 to the third location 86, as illustrated. The visual display 14 displays the interface elements 24 in the second subset 92 in the selected configuration 24B. In various examples, the swipe along the second path 90 is based on a continuous input with the user input device 12 along the first and second paths 82, 90 (e.g., a user's finger is continuous contact with a touchscreen from the first location 78 to the third location 86). In an alternative example, once the first path 82 is taken, the input may be discontinuous (e.g., any subsequent swipe on the touchscreen results in the selection of the related interface elements 24).

Figure 6C:
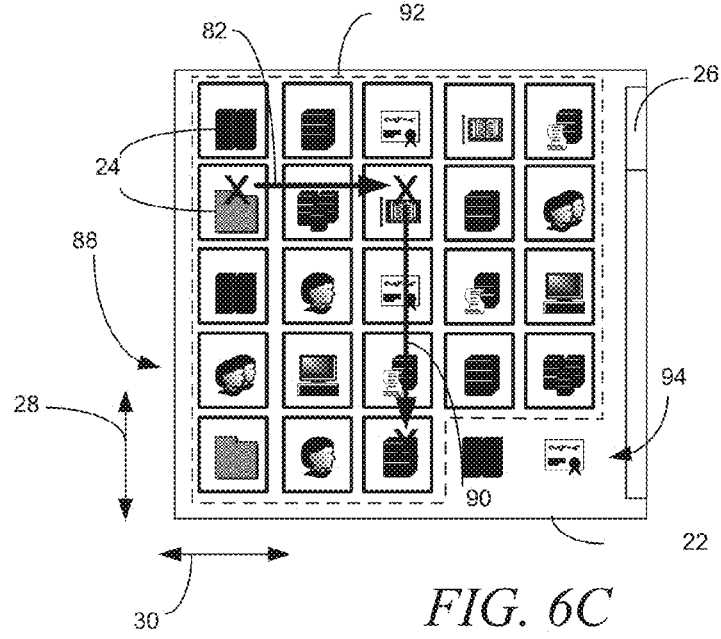

In FIG. 6C, after the input holds at the third location 86 on the original bottom row 88 after traversing along second path 90, the frame 22 scrolls down and the new bottom row 94 of interface elements 24 is displayed. Some of the interface elements 24 of the new bottom row 94 are included in the second subset 92 based on their relation to the first and second paths 82, 90.

Figure 6D:
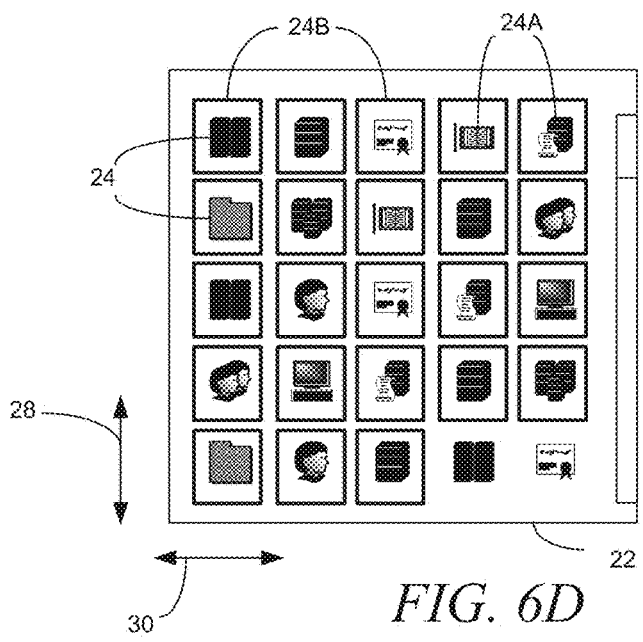

In FIG. 6D, the input as detected by the user input device 12 ceases and the interface elements 24 remain in the selected configuration 24B. It is to be recognized that in FIGS. 6A-6C, the interface elements 24 of the first and second subsets 84, 92 may optionally be held in the unselected configuration 24A until the input ceases, such as is the case in FIG. 6D and is optionally the case in FIG. 6B, whereupon the interface elements 24 of the first and second subsets 84, 92 are displayed by the visual display in the selected configuration 24B.

Figure 6E:
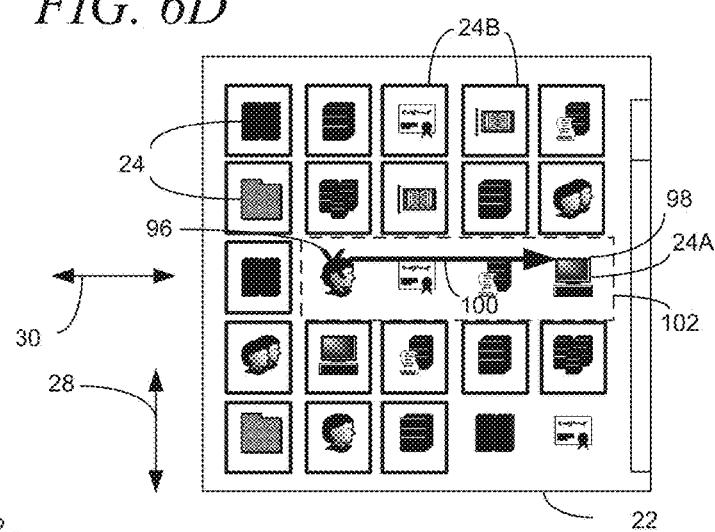

In FIG. 6E, the user input device detects an input from a fourth location 96 to a fifth location 98 along a third path 100 along the second axis 30 to form a third subset 102. The selected and unselected configuration of the interface elements 24 in relation to the third path 100 are switched to the opposing configuration. As illustrated, interface elements 24 are placed in the unselected state 24A if the interface element 24 started in the selected state 24B and in the selected state if the interface element 24 started in the unselected state 24A.

Figure 6F:
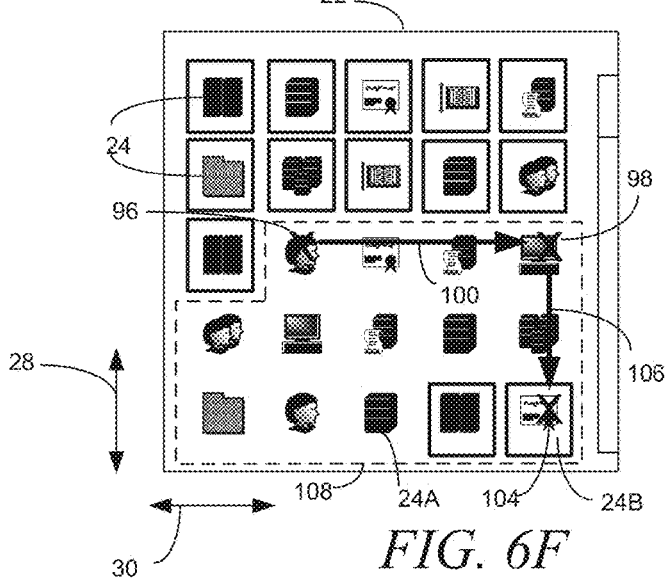

In FIG. 6F, the user input device 12 detects a swipe from or near the fifth location 98 to a sixth location 104 along a fourth path 106 along the first axis 28. The third subset 102 is expanded to a fourth subset 108 to include the interface elements 24 within a rectangular shape defined by the third and fourth paths 100, 106 as well other interface elements 24 within the rows 76 included from the second location 80 to the third location 86, as illustrated. The visual display 14 displays each of the interface elements 24 in the fourth subset 108 in a configuration 24A, 24B that is switched from the individual interface elements' 24 original configuration 24A, 24B. As illustrated, interface elements 24 are placed in the unselected state 24A if the interface element 24 started in the selected state 24B and in the selected state if the interface element 24 started in the unselected state 24A. Interface elements that were originally placed in the third subset 102 are not changed again.

As above, in various examples, the swipe along the fourth path 106 is based on a continuous input with the user input device 12 along the third and fourth paths 100, 106 (e.g., a user's finger is continuous contact with a touchscreen from the fourth location 96 to the sixth location 104). In an alternative example, once the third path 100 is taken, the input may be discontinuous (e.g., any subsequent swipe on the touchscreen results in the ultimate change of configuration 24A, 24B of the related interface elements 24).

Figure 7:
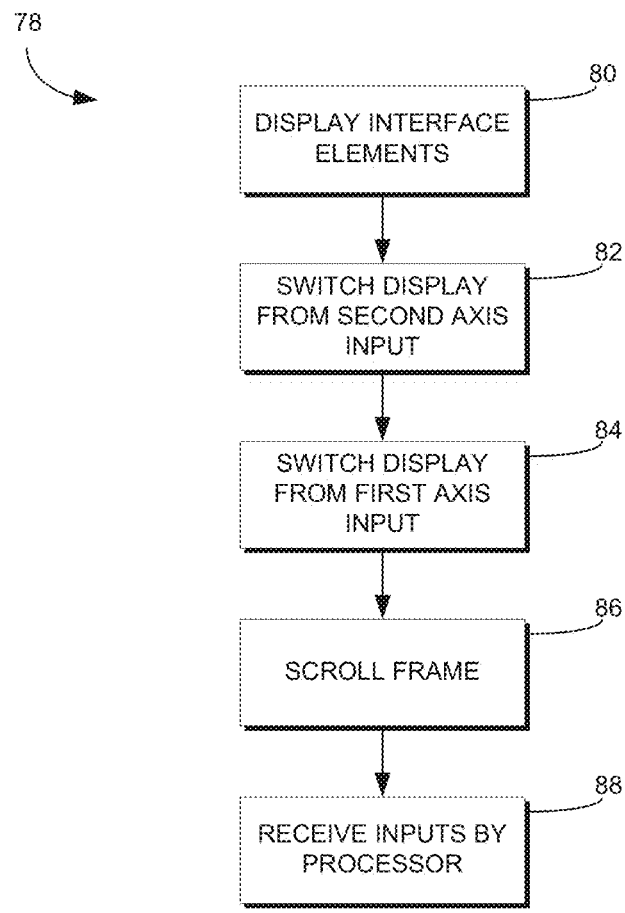
FIG. 7 is a flow chart illustrating a method, in accordance with an example embodiment, for switching an interface element between an unselected configuration and a selected configuration, in an example embodiment.

As with the example of FIGS. 6A-6C, the interface elements in relation to the third path 100 may be held in their respective original configurations 24A, 24B and then switched to their changed configuration 24A, 24B, as appropriate. It is to be understood that the example above is exemplary and that the additional movement along the first axis 28 is optional. The configuration of interface elements 24 may be switched between the unselected and selected configurations 24A, 24B simply on the basis of a swipe along the second axis 30. As noted above, execution of the interface elements 24 in the selected configuration 24B may occur automatically following the selection of the interface elements 24 or may be on the basis of an additional input FIG. 7 is a flow chart 78 illustrating a method, in accordance with an example embodiment, for switching an interface element between an unselected configuration and a selected configuration, in an example embodiment. The method may be performed by processing logic that may comprise hardware (e.g., dedicated logic, programmable logic, microcode, etc.), software (such as run on a general purpose computer system programmed to perform particular functions pursuant to instructions from program software or on a dedicated machine), or a combination of both. The processing logic, according to example embodiments, may reside in the processor 16 and memory 18 shown in FIG. 1. Alternative embodiments may comprise more, less, or functionally equivalent modules or engines in various combinations. While certain modules or engines are described as performing certain operations, these descriptions are merely examples and the operations may be performed by other components or systems.

At operation 80, interface elements are displayed in a frame of the visual display, the frame being configured to scroll along a first axis based on an input as received by a user input device being substantially along the first axis.

At operation 82, the display of interface elements of a subset of the interface elements is switched between an unselected configuration and a selected configuration in response to a first input as received by the user input device being substantially along a second axis orthogonal to the first axis. In an example, switching the display of the interface elements of the subset is further based on a proximity of the first input to the interface elements. In an example, the user input device is a touchscreen positioned with respect to the visual display, and switching the display of the interface elements is based on the first input indicating a touching of a location on the touchscreen that corresponds with the interface elements of the first subset. In an example, the first input is substantially along the second axis based on being within thirty (30) degrees of the second axis. In an example, switching between the unselected configuration and the selected configuration comprises changing an interface element in an initial unselected condition to the selected condition.

At operation 84, the display of interface elements of an expanded subset of the interface elements, the expanded subset based on the subset, is switched between the unselected configuration and the selected configuration in response to a second input, substantially along the first axis, as received by the user input device following the first input. In an example, the visual display does not switch the display of the interface elements between the unselected configuration and the selected configuration based on the input along the first axis without first receiving a first input along the second axis. In an example, the expanded subset comprises interface elements within a geometric shape defined, at least in part, by the first input and the second input. In an example, the interface elements are organized into a plurality of rows, and the expanded subset further comprises interface elements not within the geometric shape but within one of the plurality of rows corresponding to at least one of the interface elements within the expanded subset.

At operation 86, the frame is scrolled along the first axis based on the second input. The scrolling of the frame may be concurrent or substantially concurrent with switching the interface elements of the expanded subset.

At operation 88, inputs from the user input device are received by the processor and provided to the visual display. Operation 88 may be concurrent with operations 82-86.

Figure 8:
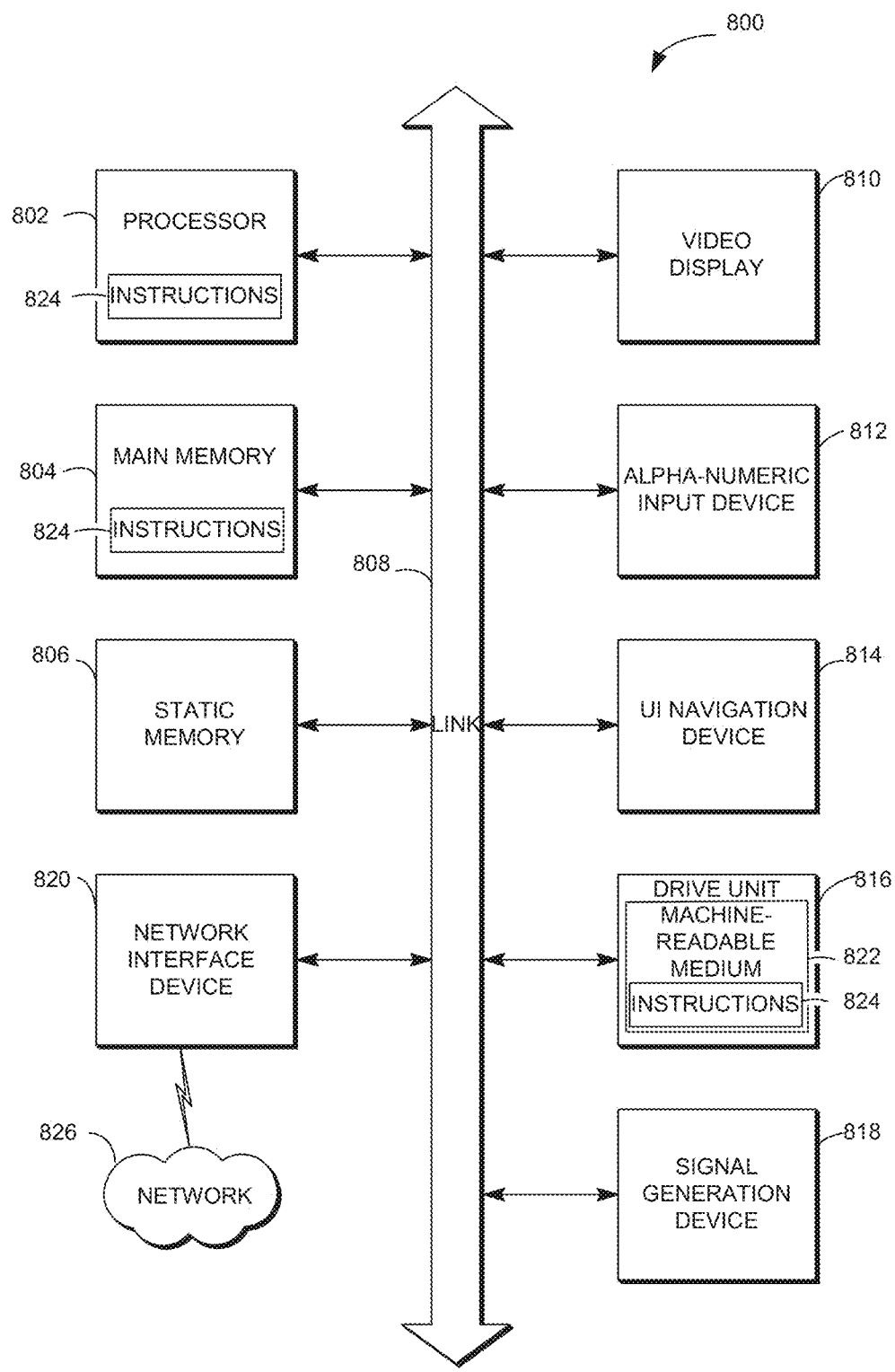
FIG. 8 is a block diagram illustrating components of a machine, according to some example embodiments, able to read instructions from a machine-readable medium and implement one or more of the example methodologies described herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system and within which instructions 824 (e.g., software) for causing the machine 800 to perform any one or more of the methodologies discussed herein may be executed. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a light emitting diode (LED) display, a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 via the network interface device 820.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 800), such that the instructions, when executed by one or more processors of the machine (e.g., processor 802), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Thus, method and system for to select interface elements within a scrolling frame have been described. While some example approaches described herein may be used with ADOBE® products, the techniques described herein may be utilized beneficially with various other products.

The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

What is claimed is:

1. A system, comprising:
a user input device configured to receive an input from a user;
a visual display configured to:
    display interface elements in a frame configured to scroll along a first axis based on the input as received by the user input device being substantially along the first axis;
    switch display of interface elements of a subset of the interface elements between an unselected configuration and a selected configuration in response to a first input as received by the user input device as a first path from a first location to a second location being substantially along a second axis orthogonal to the first axis; and
    switch display of interface elements of an expanded subset of the interface elements between the unselected configuration and the selected configuration in response to a second input, traversing a second path substantially along the first axis from the second location to a third location, as received by the user input device following the first input,
        wherein the expanded subset comprises interface elements within an area defined, at least in part, by the first path and the second path;
    wherein the visual display does not switch display of the interface elements between the unselected configuration and the selected configuration based on the input along the first axis without first receiving the first input traversing the first path from the first location to the second location substantially along the second axis.

2. The system of claim 1, wherein the expanded subset is based on the subset.

3. The system of claim 2, wherein the interface elements are organized into a plurality of rows; and
wherein the expanded subset further comprises interface elements not within the area but within one of the plurality of rows corresponding to at least one of the interface elements within the expanded subset.

4. The system of claim 2, wherein the second input further causes the frame to scroll along the first axis.

5. The system of claim 1, wherein the visual display is configured to switch the display of the interface elements of the subset further based on a proximity of the first input to the interface elements.

6. The system of claim 5, wherein the user input device is a touchscreen positioned with respect to the visual display; and
wherein the visual display is configured to switch the display of the interface elements based on the first input indicating a touching of a location on the touchscreen that corresponds with the interface elements of the first subset.

7. The system of claim 1, wherein the first input is substantially along the second axis based on being within thirty (30) degrees of the second axis.

8. The system of claim 2, wherein the first input and second input are received by the user input device as a continuous input.

9. The system of claim 1, wherein the visual display is configured to switch display between the unselected configuration and the selected configuration by changing an interface element in an initial unselected condition to the selected condition.

10. A method, comprising:
displaying, with a visual display, interface elements in a frame configured to scroll along a first axis based on an input as received by a user input device being substantially along the first axis;
switching display, with the visual display, of interface elements of a first subset of the interface elements between an unselected configuration and a selected configuration in response to a first input as received by the user input device being substantially along a second axis orthogonal to the first axis as a first path from a first location to a second location;
in response to a second input subsequent to the first input, the second input traversing a second path substantially along the first axis, expanding the first subset to an expanded subset to include interface elements within a rectangular shape defined by the first path and the second path;
wherein the visual display does not switch display of the interface elements between the unselected configuration and the selected configuration based on the input along the first axis without first receiving the first input traversing the first path from the first location to the second location substantially along the second axis;
wherein prior to receiving the first input along the second axis, the input along the first axis is interpreted as a scroll input; and
wherein subsequent to receiving the first input along the second axis, the input along the first axis is interpreted as a selection input.

11. The method of claim 10, further comprising switching display, with the visual display, of interface elements of the expanded subset of the interface elements between the unselected configuration and the selected configuration.

12. The method of claim 11, wherein the interface elements are organized into a plurality of rows; and
wherein the expanded subset further comprises interface elements not within the rectangular shape but within one of the plurality of rows corresponding to at least one of the interface elements within the expanded subset.

13. The method of claim 11, further comprising scrolling, with the visual display, the frame to scroll along the first axis based on the second input.

14. The method of claim 10, wherein switching display of the interface elements of the subset is further based on a proximity of the first input to the interface elements.

15. The method of claim 14, wherein the user input device is a touchscreen positioned with respect to the visual display; and
wherein switching display of the interface elements is based on the first input indicating a touching of a location on the touchscreen that corresponds with the interface elements of the first subset.

16. The method of claim 10, wherein the first input is substantially along the second axis based on being within thirty (30) degrees of the second axis.

17. The method of claim 10, wherein the first input and second input are received by the user input device as a continuous input.

18. The method of claim 10, wherein switching between the unselected configuration and the selected configuration comprises changing an interface element in an initial unselected condition to the selected condition.

* * * * *